United States Patent Office 3,440,166
Patented Apr. 22, 1969

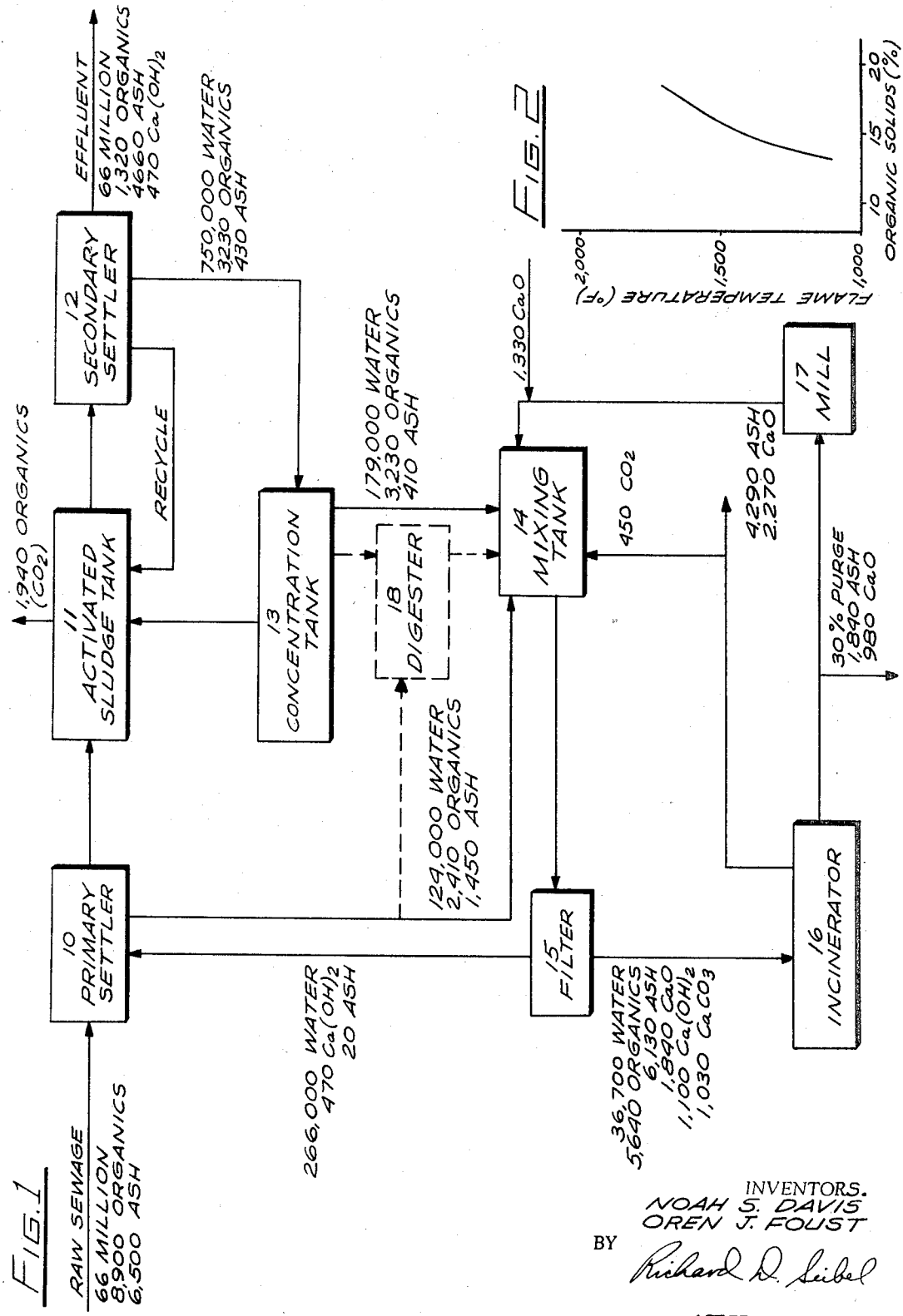

3,440,166
WASTE TREATMENT PROCESS WITH RECYCLING FLOCCULATING AGENTS
Noah S. Davis, Northridge, and Oren J. Foust, Granada Hills, Calif., assignors to North American Rockwell Corporation, a corporation of Delaware
Filed June 13, 1967, Ser. No. 645,817
Int. Cl. C02c 1/06
U.S. Cl. 210—8                        14 Claims

ABSTRACT OF THE DISCLOSURE

A process is described for treatment of sewage wherein activated sludge is produced which may be treated directly or may be digested in a second embodiment for further treatment. The sludge is thereafter flocculated by sequential additions of carbon dioxide and hydrated calcium oxide. The flocculated sludge is filtered to remove water from the solids and the filter cake is incinerated. Flue gas from the incinerator is recycled to the sludge for providing carbon dioxide thereto and calcium oxide in the solid product of the incinerator is ground and recycles to provide hydrated calcium oxide for inducing flocculation.

BACKGROUND

In the treatment of industrial or municipal sewage one of the principal problems is the disposition of sludge. In a typical sewage treatment process solids are separated and dissolved material is converted to solid micro-organisms as either activated sludge or digested sludge, all of which must be disposed of in some way. Typical dispositions of sludge include use as land fill or drying for fertilizer. These have been found to have limited applicability and much sewage sludge is disposed of by oxidation to reduce its volume. The oxidation may be in solution in a so-called Zimmerman process or the sludge may be burned in air to remove the organic materials. The resultant ash and incombustable solids are normally disposed of as land fill.

In order to burn or incinerate the organic materials in the sludge it is first necessary to eliminate water therefrom. The principal portion of water is removed by flocculating, settling and filtering the sludge for producing a filter cake. The filter cake is then incinerated in roasters or furnaces that evaporate the water in the first stages thereof and burn the organic solids in later, higher temperature, regions thereof. If the quantity of organic solids contained in the sludge is too low to support combustion at a temperature of at least 1,400° F. it is necessary to add auxiliary fiuel to the furnace in order to minimize malodorous products.

It is therefore desirable to produce a filter cake having a relatively high content of organic solids or low water content for minimizing the heat load required for evaporation of the water and for producing a high flame temperature.

In order to produce a reasonably dry filter cake with appreciable yields, it is practice in the industry to flocculate the sludge prior to filtration. The standard in the industry is flocculation with ferric chloride and lime. These materials accumulate as insoluble calcium hydroxide and ferric hydroxide and are disposed of as land fill. The cost of the ferric chloride and lime is a substantial factor in the cost of sewage disposal.

Other processes for treating waste materials involving improved flocculation and employing other chemicals and involving other suspensions are described in copending U.S. patent applications Ser. No. 645,818 entitled "Waste Treatment Process with Recycling of Lime," by Noah S. Davis, Oren J. Foust and Thomas W. Withers; Ser. No. 645,816 entitled "Flocculation of Suspensions," by Noah S. Davis and Oren J. Foust; and Ser. No. 645,821 entitled "Combined Waste Treatment and Cement Making Method and Means," by Noah S. Davis; the latter of which comprises an improvement related to the processes herein described and claimed.

SUMMARY OF THE INVENTION

Thus, there is provided in the practice of this invention according to a preferred embodiment, a process for flocculating sludge by sequential additions of carbon dioxide and hydrated calcium oxide and recovery of calcium oxide from the flocculated solids for providing economical sewage treatment. Incineration of separated solids produces calcium oxide which is at least partly recycled for flocculation of the sludge. In a preferred embodiment carbon dioxide is also recycled from the incineration step to cause flocculation.

Objects and many of the attendant advantages of this invention will be understood by reference to the following detailed description when considered in conjunction with the drawings wherein:

FIG. 1 illustrates a flow diagram of a sewage treatment process incorporating the principles of this invention; and FIG. 2 comprises a graph of flame temperature versus percent solids for incinerating sludge.

In the practice of this invention according to a preferred embodiment there is provided a process as illustrated by a typical flow diagram in FIG. 1. Broadly the process described in detail hereinafter and illustrated by the diagram of FIG. 1 comprises settling of primary sludge from raw sewage in a settler 10 followed by conversion to activated sludge by aerobic bacteria in a tank 11. The sludge is separated in a settler 12 and clarified effluent water is discharged from the system. The sludge is concentrated in a tank 13 and carbon dioxide and hydrated calcium oxide are sequentially added to the concentrated sludge in a tank 14 whereby substantially instantaneous flocculation of solids occurs. The flocculated sludge is filtered in a vacuum filter 15 and the filter cake is burned in an incinerator 16 for removing organics and also converting clacium compounds in the filter cake to calcium oxide. A portion of the incinerator product is purged or discarded and the balance is ground in a mill 17 and recycled to the tank 14 to supply calcium oxide for causing flocculation. Flue gas from the incinerator 16 is also recycled to the tank 14 for providing carbon dioxide thereto.

Thus as illustrated in FIG. 1, raw sewage is fed into a primary settler 10 which is a conventional item in sewage treatment which provides a relatively slow flow of sewage so that larger and heavier solid materials settle to the bottom of the tank and floating materials such as fats and grease are skimmed from the surface of the sewage. The materials removed in the primary settler 10 include organics and most of the insoluble ash in the raw sewage.

In a typical embodiment about 66 million pounds of raw sewage per hour (about 7.9 million gallons) enters the system which is typical of the quantity of municipal waste from a moderate size city. Throughout the description quantities of materials are stated in pounds per hour (sometimes merely stated as pounds) and these typical flow rates have been rounded off to the nearest 10 pounds or three significant figures which may lead to minor discrepancies in absolute balance of the flow diagram. It should be recognized of course, that the values set forth for flow rates are typical of a particular sewage composition and treatment process and that substantial variation in the quantities may occur in practice of this invention on other waste products and within the range of chemical additives found operable. It will also be apparent that many conventional pumps, weirs, valves, and the like are employed in carrying out a process as herein described and these have been omitted from the detailed description. Likewise it will be recognized that control of the process may be manual or preferably may be automatic.

In a typical municipal sewage 66 million pounds would contain about 8,900 pounds per hour of organic materials in solution and suspension, and about 6,500 pounds per hour of ash. Ash, for the purposes of discussion herein, comprises mineral matter such as the inherent hardness of the water and dissolved chemicals which are not organically decomposed in the activated sludge system, as well as particulate material.

In a typical embodiment a substantial amount of the organics and mineral solids are removed in the primary settler; thus, for example, about 124,000 pounds per hour of water containing about 2,410 pounds per hour of organics and about 1,450 pounds per hour of ash may be removed as a slurry from the primary settler. This material which is known as primary sludge is settled or skimmed from the primary settler 10 and is mixed with additional sludge prior to filtration as hereinafter described.

The liquid effluent with a substantial amount of suspended solids therein is passed from the primary settler 10 to an activated sludge tank 11. The activated sludge tank 11 comprises a conventional processing apparatus in the sewage treatment field wherein sewage is aerobically processed by microorganisms. These microorganisms, principally bacteria, employ the dissolved and suspended organic materials in the sewage as nutrient, thereby converting substantial amounts of the dissolved and suspended organic materials to carbon dioxide which escapes from the activated sludge to the atmosphere. A substantial portion of the organics are converted to cellular microorganisms which are known as activated sludge. In a typical embodiment as illustrated in FIG. 1 about 1,940 pounds per hour of organic materials is converted to carbon dioxide which escapes to the atmosphere.

The activated sludge produced in the activated sludge tank 11 is passed to a secondary settler 12. In the secondary settler 12 the activated sludge rapidly settles from the liquid leaving a relatively clear supernatent. This supernatent liquid from the settler has a sufficiently low Biological Oxygen Demand (BOD) to be discharged as plant effluent to a receiving body of water such as a river, lake or ocean. In the embodiment illustrated herein the effluent of the plant is nearly 66 million pounds per hour which is principally water containing about 1,320 pounds per hour of dissolved and suspended organic materials and about 4,660 pounds per hour of ash dissolved therein. In addition, about 470 pounds per hour of calcium hydroxide is dissolved in the water as hereinafter described.

The solid microorganisms and the like in the activated sludge form a slurry having from about 0.4 to 0.5% solids. The principal portion of the slurry from the secondary settler 12, usually as much as 15 million pounds per hour, is recycled to the activated sludge tank 11 in order to maintain a very high cell concentration of microorganisms so that the residence time in the aeration tank 11 for sewage treatment is relatively short. It is also necessary to dispose of a portion of the activated sludge from the secondary settler 12 and this presents a considerable disposal problem in conventional plants because of the high water content and the inherent difficulty of filtering this material.

In a typical embodiment as illustrated herein about 750,000 pounds per hour of water (about 90,000 gallons) containing 3,230 pounds per hour of organics and about 430 pounds per hour of ash may be removed from the secondary settler 12 for further treatment. It is preferred to circulate this activated sludge to a concentration tank 13 wherein the sludge is permitted to further settle to increase the solids content and the effluent liquid from the concentration tank 13 is recycled to the activated sludge tank or primary settler. After concentration the slurry may have about 2% solids such as, for example, about 179,000 pounds per hour of water containing 3,230 pounds per hour of organics and 410 pounds per hour of ash.

This somewhat concentrated activated sludge is then passed to a mixing tank 14 where it may be mixed with primary sludge from the primary settler 10. The activated sludge is a relatively difficult material to filter and mixing with the primary sludge enhances the filterability thereof.

Also added in the mixing tank 14 in a typical embodiment is about 450 pounds per hour of carbon dioxide. This material is obtained as flue gas from an incinerator 16 hereinafter described and is bubbled or sparged through the activated sludge in gaseous form. About 10 to 30 minutes is sufficient to substantially saturate the sludge with carbon dioxide and addition thereof is terminated prior to the formation of bicarbonates in the sludge.

Sequentially after adding the carbon dioxide about 3,600 pounds per hour of calcium oxide is added to the mixing tank 14. Flocculation of solid material in the sludge is caused by sequential additions of carbon dioxide and calcium oxide. Pre-mixing of these materials is substantially ineffective for inducing rapid flocculation. The tank 14 may comprise mechanically stirred or airlift type mixers preferably in two separate chambers for sequential additions of carbon dioxide and calcium oxide. This tank may also comprise merely a channel or conduit for continuous flow wherein carbon dioxide may be bubbled in a first region and calcium oxide may be added in a second region that is subjected to turbulent flow. The calcium oxide is preferably hydrated prior to addition to the mixing tank 14 and such a material is conventionally known as slaked lime. If the calcium oxide is not hydrated prior to addition to the mixing tank a sprinkling of fine powder thereof on the turbulently mixed slurry involves substantially immediate hydration thereof and similar results are obtained. If slaked prior to addition to the mixing tank, about 3 to 10 times as much water as calcium oxide is employed and the material is allowed to slake for a few minutes prior to addition. It has been found that slaking for as long as three hours prior to addition has no noticeably detrimental effect on the process.

It is preferred to mix the hydrated calcium oxide with the activated sludge within about 1 minute, and it is found that substantially instantaneous flocculation of the solids occurs upon such mixing. The resultant flock is relatively large and is of better quality than obtained with additions of ferric chloride and lime as in the conventional practice. The flocculated material may then be settled or is passed directly to a conventional vacuum filter 15 where a substantial amount of the water is withdrawn from the slurry as a filtrate. About 266,000 pounds per hour of water containing about 20 pounds of ash dissolved therein and about 470 pounds of calcium hydroxide dissolved therein is returned from the filter 15 to the primary settler or to the activated sludge tank. The filter 15 also produces a relatively dry filter cake which may have about 35% solids. This filter cake typically has about 36,700 pounds per hour of water, 5,640 pounds per hour of organics, 6,130 pounds per hour of ash, about 1,840 pounds per hour of calcium oxide, about 1,100 pounds per hour of calcium hydroxide, and about 1,030 pounds per hour of calcium carbonate.

The filter cake is fed from the filter 15 to a conventional multiple hearth roaster 16 or Herreschof type furnace or a rotary kiln wherein it is heated to at least 1,520° F. in order to oxidize the organic materials without production of malodorous products, and for calcining the calcium compounds to calcium oxide as hereinafter described. The first few hearths of the roaster serve principally to dry the filter cake and further into the incinerator autogenous combustion of the organic material in the filter cake occurs with consequent production of heat. If necessary, in order to reach sufficiently high temperatures additional fuels such as gas or oil may be employed in the incinerator as is conventional practice. The incinerator extracts from the filter cake about 36,700 pounds per hour of water and about 5,650 pounds per hour of organics, which are discharged in the flue gases in the form of water vapor and carbon dioxide. In addition, a solid ash is produced comprising calcium oxide which is calcined from the calcium hydroxide and calcium carbonate in the filter cake. A substantial amount of insoluble ash is also present in the solid product of the incinerator, intimately mixed with the calcium oxide as clinkers or powder.

In the practice of this invention according to a preferred embodiment about 30% of the incinerator solid product is purged or discarded by simply diverting a portion to land fill or the like. This amounts to about 980 pounds per hour of calcium oxide mixed with about 1,840 pounds per hour of ash. Such a purge is necessary in a system involving recycling to eliminate the ash coming into the system in the raw sewage. It will be apparent to one skilled in the art that the percentage of purge can be varied to control the quantity of ash being recycled with calcium oxide.

The balance of the solid product of the incinerator 16 (for example, 70%) is passed to a conventional grinding mill 17 such as a ball or rod mill for comminuting the calcined lime. The finely ground product which includes about 2,270 pounds per hour of calcium oxide and about 4,290 pounds per hour of ash, principally silica, is fed back into the mixing tank 14 in order to induce flocculation. Since a portion of the calcium oxide is purged from the system continuously an additional 1,330 pounds per hour of calcium oxide is added as makeup. In addition to the calcium oxide removed from the system as part of the purge, additional calcium oxide is lost from the waste treatment plant in the form of calcium hydroxide dissolved in the liquid effluent from the secondary settler 12.

As mentioned, in addition to the calcium oxide contained in the solid material recycled from the mill 17 to the mixing tank 14, there is a substantial amount of ash which does not enhance flocculation of the activated sludge. The insoluble ash is, however, substantially beneficial to the filtering by providing readily filterable solid particles acting as a "filter aid" in a manner as is well-known to those skilled in the art.

The organic materials fed to the incinerator 16 have a heat of combustion of about 11,000 B.t.u. per pound which is sufficient to provide most, if not all, of the heat required for combustion in the incinerator. The stable flame temperature achieved in the incinerator is highly dependent upon the moisture content of the filter cake fed thereto in the absence of auxiliary fuel. FIG. 2 comprises a plot of approximate flame temperature in a multiple hearth incinerator against the percentage of organic solids in the filter cake on an ash free basis. The minimum temperature for flame stability is about 1,100° F., however, it is preferred in burning activated sludge filter cake according to the principles of this invention, to achieve a temperature of at least 1,520° F. in the incinerator in order to minimize odor problems due to incomplete combustion of the last traces of organic material and in order to calcine calcium carbonate to calcium oxide for recycling as hereinabove described. Calcium hydroxide present in the filter cake is calcined to calcium oxide at a lower temperature, namely about 1,085° F.

As can be seen from FIG. 2 the flame temperature achieved in a multiple hearth incinerator is highly sensitive to small variations in the organic solids content of the filter cake fed to the incinerator. When the percentage of organic solids in the filter cake is above about 13.5 the heat of combustion thereof is sufficient to maintain a flame of at least 1,100° F. In order to maintain a flame temperature of 1,520° F. without addition of any auxiliary fuel an organic solid content of about 17% is required. When the organic solid content of the filter cake is higher than this value no auxiliary fuel is required in the incinerator and highly economical operation results. Since a change in organic solid content of as little as 1% can make a difference in flame temperature of about 150° F. it is readily apparent that relatively small improvements in filter cake dryness or percent solids therein can lead to very substantial economic advantages.

As mentioned hereinabove one of the standard techniques for flocculation of activated sludge comprises additions of ferric chloride and lime to cause flocculation. In order to ascertain the characteristics of a process of sequentially adding carbon dioxide and hydrated calcium oxide to activated sludge, the filtration characteristics were compared with the standard ferric chloride and lime process. Measurements were made of the filtration rate or yield, that is, the quantity of material filtered per unit of filter area and of the dryness of the filter cake achieved. The standard flocculent ferric chloride plus lime gave a slightly higher yield for activated sludge.

It was found, however, that improved dryness is obtained in the filter cake employing sequential additions of carbon dioxide and calcium oxide to the activated sludge. Appreciably improved settling characteristics were also found with additions of carbon dioxide and calcium oxide as compared with ferric chloride and lime. This property is of appreciable significance if an elutriation step is employed.

Elutriation is sometimes employed between the flocculation in the mixing tank and the vacuum filtration, and involves removal of relatively clear supernatant from settled sludge and addition of fresh water thereto in order to reduce the concentration of interfering chemicals. The effluent from the elutriation step, if employed, is recycled to the activated sludge tank.

In addition to the economies resulting from the somewhat drier filter cake obtained using sequential additions of carbon dioxide and calcium oxide, further economies are obtained by recycling calcium oxide after incineration. The calcium compounds in the filter cake are calcined to calcium oxide in the incinerator and as much as 70% is recycled in the system thereby resulting in substantial reductions in the cost of chemical additives. The only added cost is that of milling the incinerator product in a ball mill or the like, and this is a relatively inexpensive operation since, at worst, a weak sinter is obtained from a hearth roaster.

In addition, substantial economies are obtained by employing carbon dioxide in the flue gases from the incinerator as one of the flocculating additives. This material is normally dissipated to the atmosphere and serves no useful purpose. The flue gas from the incinerator is found to contain about 20% carbon dioxide and this material, when sparged in the mixing tank 14 relatively quickly results in saturation of the sludge with carbon dioxide.

It has been found that variations can be made in the quantities of carbon dioxide and calcium oxide added to the activated sludge in order to induce flocculation. It is preferred that the carbon dioxide be in the range of from about 5 to 15 pounds per thousand gallons of sludge for each percent of solids suspended therein. Thus, for example, if 1,000 gallons of sludge (about 8,340 pounds) having 1.5% solids were being treated, the quantity of carbon dioxide added would preferably be in the range of from about 7.5 to 22.5 pounds. If the added carbon dioxide is less than about five pounds per thousand gallons per percent of solids the flocculation is noticeably poorer, possibly due to a higher pH, and a lower filtration rate is obtained. It is preferred that the addition of carbon dioxide be less than about 15 pounds per thousand gallons of sludge since this represents a figure near the solubility limit thereof and additions beyond this value are of little increased efficacy.

It is preferred that calcium oxide be added to the activated sludge sequentially after the carbon dioxide and in the range of from about 30 to 200 pounds per thousand gallons of sludge for each percent of solids suspended therein. Additions of less than about 30 pounds of calcium oxide per thousand gallons are relatively less effective in causing flocculation and the filtration characteristics of the sludge are diminished. When more than about 200 pounds of calcium oxide is added per thousand gallons of sludge no significant change in flocculation characteristics is noted and any additional materials are present merely as filter aids. In general, the higher the amount of addition agents made to the sludge, the better is the flocculation.

In another embodiment the concentrated activated sludge from the concentration tank 13 may be transferred to a digester 18 wherein it is mixed with primary sludge from the primary settler 10. This alternative is illustrated in FIG. 1 by the dotted paths. A digester is a conventional item in sewage treatment operations and comprises a closed tank in which anaerobic bacteria decompose the organic materials in the activated sludge. Typically the material resides in the digester for about 30 days when the tanks are maintained at about 95° F. During the course of anaerobic decomposition of the organic materials, substantial amounts of methane and carbon dioxide are produced. The methane is preferably employed for fuel in the process either for heating the digester, producing electricity, or preferably as an auxiliary fuel for the incinerator.

The slurry product from the digester 18 is known as digested sludge and this material is thereafter treated in substantially the same manner as activated sludge hereinabove described. It is found, however, that somewhat smaller quantities of flocculating agents may be economically employed with digested sludge as compared with activated sludge because of the relatively better inherent filterability thereof, however, the same range of agents has been found preferable. The digested sludge is flocculated in the mixing tank 14 in substantially the same manner as hereinabove described.

Applications of the principles of this invention are illustrated in the following non-limiting examples:

EXAMPLES

Numerous flocculation and filtering tests were conducted according to the principles of this invention. These tests were conducted on activated sludge from the Hyperion treatment plant handling municipal sewage at Los Angeles, Calif. The test material, which normally contains between 1% and 2% of solids, was extracted from the regular process stream after the activated sludge was concentrated by settling. The filtration tests were conducted according to conventional practice with a standard 0.1 square foot filter leaf substantially as pointed out in the Chemical Engineers' Handbook (McGraw-Hill Book Co., 4th ed., 1963, pp. 19–59).

Carbon dioxide was added from a cylinder of compressed gas diluted to 20% $CO_2$ with 80% of air and calcium oxide added to the sludge was mixed with five milliliters of water per gram of calcium oxide and allowed to slake for 10 minutes prior to addition to the sludge. In the cases where ferric chloride was employed one gram of 100% $FeCl_3$ was mixed with 20 milliliters of distilled water.

The activated sludge was saturated with carbon dioxide in batches of about five liters. This was accomplished by inserting a carbon dioxide sparger into the activated sludge and flowing carbon dioxide bearing gas therethrough to obtain a vigorous bubbling action in the activated sludge. The saturation process was continued for at least 20 minutes and not more than 30 minutes, thereby reducing the pH of the activated sludge to about 6 to 7.

At this point one-liter samples of activated sludge saturated with carbon dioxide were poured into four-liter beakers approximately six inches in diameter. The sludge was stirred with a paddle stirrer approximately 4½ inches by ¾ inch at 100 r.p.m.

The slaked lime which comprises an aqueous mixture of CaO and $Ca(OH)_2$ was added to the activated sludge and stirring was continued for one minute. Filtration tests were then made without settling.

Filtration tests were made by immersing a conventional filter leaf in the suspension for a period of one minute with vacuum applied, followed by three minutes of drying or de-watering of the filter cake on the filter media. After peeling the filter cake from the filter media it was weighed and dried to provide data for the percentage of solids in the filter cake and the total yield of dry solids.

Similarly, in order to compare with standard techniques employed in the sewage treatment industry, a combination of ferric chloride and lime was employed for flocculation. These tests were conducted in substantially the same manner as the carbon dioxide and lime tests. In these tests the ferric chloride solution was poured into the activated sludge and allowed to mix for one minute with the stirrer set at 75 r.p.m. After one minute mix the slaked lime mixture was stirred into the suspension of activated sludge for two minutes. The filtration operation was conducted in the same manner as for carbon dioxide and lime tests. The ratio of CaO to $FeCl_3$ was held at four for the filtration tests since this ratio is considered in the industry to be the optimum ratio for conditioning sludge prior to filtration.

The table presents data from a series of tests made with several samples of activated sludge and a spectrum of proportions of flocculating additives. The table includes the percentage of solids in the original sludge including both suspended and dissolved organics and ash. The quantities of carbon dioxide, ferric chloride, and calcium oxide added are shown in grams per liter of sludge suspension. Multiplication of the figure by 10 is approximately the number of pounds per thousand gallons of suspension. The table also presents the percentage of solids in the filter cake removed from the filter leaf, higher numbers indicating drier cake. The calculated yield of dried solids stated in the units of pounds per hour per square foot of filter area gives an indication of the filter area required in a plant to remove a given weight of solids.

TABLE

| Percent solids in sludge | $CO_2$ added, grams/liter | CaO added, grams/liter | Percent solids in filter cake | Yield, lbs./hr./ft.$^2$ |
| --- | --- | --- | --- | --- |
| 1.86 | 1.5 | 9.33 | 20.09 | 0.41 |
| 1.86 | 1.5 | 14.0 | 22.05 | 0.55 |
| 1.86 | 1.5 | 16.0 | 21.03 | 0.59 |
| 1.99 | 1.5 | 12.0 | 20.86 | 0.57 |
| 1.85 | 1.5 | 14.0 | 22.28 | 0.57 |
| 1.84 | 1.5 | 12.0 | 20.19 | 0.53 |
| 1.84 | 1.5 | 13.0 | 21.04 | 0.52 |
| 1.84 | 1.5 | 14.0 | 21.32 | 0.57 |
| 1.84 | 1.5 | 15.0 | 23.03 | 0.57 |
| 1.84 | 1.5 | 16.0 | 24.94 | 0.55 |
| 1.69 | 1.5 | 8.5 | 20.52 | 0.28 |
| 1.85 | 1.5 | 7.0 | 19.64 | 0.32 |
| 1.76 | 1.5 | 6.0 | 17.20 | 0.40 |

| Percent solids in sludge | $FeCl_3$ added, grams/liter | CaO added, grams/liter | Percent solids in filter cake | Yield, lbs./hr./ft.$^2$ |
| --- | --- | --- | --- | --- |
| 1.58 | 1.0 | 4.0 | 16.20 | 0.83 |
| 1.58 | 0.75 | 3.0 | 13.89 | 0.78 |
| 1.37 | 1.25 | 5.0 | 18.59 | 1.09 |
| 1.47 | 0.75 | 3.0 | 15.08 | 0.72 |
| 1.54 | 1.25 | 5.0 | 17.34 | 1.03 |
| 1.34 | 1.5 | 6.0 | 19.7 | 1.18 |
| 1.48 | 1.5 | 6.0 | 16.71 | 1.26 |
| 1.15 | 2.05 | 4.2 | 16.17 | 1.00 |
| 1.15 | 1.35 | 5.3 | 19.73 | 1.37 |
| 1.367 | 0.75 | 3.0 | 15.34 | 0.66 |
| 1.367 | 1.5 | 6.0 | 16.58 | 0.97 |

The data in the table illustrate that the percentage of dry solids in the filter cake is substantially higher for activated sludge flocculated by additions of carbon dioxide and slaked lime than for activated sludge flocculated with the conventional ferric chloride and slaked lime process. Even in these few examples wherein the cake is drier after ferric chloride treatment it will be recognized that the cost of flocculating additives is lower for carbon dioxide and lime than for ferric chloride and lime. Filter yield is somewhat lower for carbon dioxide and lime additions than for ferric chloride and lime additions. It is significant that the filter cake is appreciably drier for the carbon dioxide and the lime combination since this leads to substantial economies in incineration of the resultant cake. As pointed out hereinabove, 1% increase in organic solids content gives a flame temperature about 150° F. higher.

Furthermore, the resultant filter cake, when incinerated yields a solid product containing substantial quantities of CaO which is substantially free of iron and is readily recycled in the process for treating activated sludge.

Incineration also produces carbon dioxide which is recycled for further economy of operation.

It is to be understood that the above described examples are merely illustrative of the application of the principles of this invention. Those skilled in the art may readily devise other variations that will embody the principles of the invention. It is therefore to be understood that within the scope of the appended claims the invention may be practiced otherwise than as specifically described.

What is claimed is:

1. In an activated sludge waste treatment process the improvement comprising:
   flocculating sludge by the sequential steps of mixing carbon dioxide in the sludge in a quantity sufficient to substantially saturate the sludge with carbon dioxide and less than sufficient to form substantial quantities of bicarbonates in the sludge and sequentially thereafter mixing hydrated calcium oxide in the sludge, whereby solids in the sludge are substantially instantaneously flocculated;
   filtering flocculated solids from the liquid; and
   recovering useable calcium oxide from the separated solids.

2. A process as defined in claim 1 wherein the recovering step comprises:
   heating the flocculated solids to a temperature at least high enough to decompose calcium hydroxide to calcium oxide; and
   recycling at least a portion of the calcium oxide to the flocculating step thereby effecting operating economies.

3. A process as defined in claim 2 further comprising:
   purging a portion of the calcium oxide for minimizing buildup of undesirable materials in the process.

4. A process as defined in claim 2 wherein the sludge comprises activated sludge.

5. A process as defined in claim 2 wherein the sludge comprises digested sludge.

6. A process as defined in claim 2 wherein the heating step comprises heating the flocculated solids to a temperature at least high enough to decompose calcium carbonate to calcium oxide.

7. A process as defined in claim 6 wherein the carbon dioxide is added in the range of from about 5 to 15 pounds of carbon dioxide per 1,000 gallons of sludge per one percent of solids suspended therein.

8. A process as defined in claim 7 wherein the hydrated calcium oxide is added in the range of from about 30 to 200 pounds of calcium oxide per 1,000 gallons of sludge per one percent of solids suspended therein.

9. A process as defined in claim 8 wherein the sludge includes ash and further comprising the step of:
   purging a portion of the calcium oxide from said heating step for removing a portion of the ash from the recycling step and minimizing buildup of undesirable materials.

10. A process as defined in claim 1 wherein said heating step includes heating the solids in air for combustion of organic materials therein to produce carbon dioxide; and
    recycling a portion of the carbon dioxide to the flocculating step.

11. A process as defined in claim 10 wherein said recovering step comprises:
    incinerating organic material in the separated solids, the temperature of incineration being sufficiently high to minimize undesirable odors and to decompose calcium carbonate to calcium oxide.

12. A process as defined in claim 11 further comprising:
    recycling a portion of the calcium oxide from the incinerating step to the flocculating step.

13. A process for waste treatment comprising:
    aerobically converting organic wastes to activated sludge;
    separating a portion of water from the activated sludge;
    mixing carbon dioxide with a portion of sludge in the range of from about 5 to 15 pounds of carbon dioxide per 1,000 gallons of sludge per one percent of solids suspended therein, the quantity of carbon dioxide being sufficient to substantially saturate the sludge and insufficient to form substantial amounts of bicarbonates;
    sequentially thereafter mixing hydrated calcium oxide with the portion of sludge in the range of from 30 to 200 pounds of calcium oxide per 1,000 gallons of sludge per one percent of solids suspended therein, whereby solids in the sludge are substantially instantaneously flocculated;
    filtering the sludge for separating water from the flocculated solids;
    incinerating the filtered solids at a temperature at least high enough to decompose calcium carbonate to calcium oxide;
    recycling carbon dioxide from the incinerating step to the first mixing step for effecting operating economies;
    purging a portion of the calcium oxide from the incinerating step for minimizing buildup of undesirable materials;
    comminuting another portion of the calcium oxide from the incinerating step; and
    recycling the comminuted calcium oxide to the second mixing step for causing flocculation and effecting operating economies.

14. A process as defined in claim 13 further comprising the step of:
    anaerobically digesting the activated sludge to form digested sludge prior to said mixing steps.

References Cited

UNITED STATES PATENTS

| | | | |
|---|---|---|---|
| 1,876,123 | 9/1932 | Wright | 210—152 |
| 2,044,582 | 6/1936 | Lykken et al. | 210—45 |
| 2,044,584 | 6/1936 | Rankin | 210—45 |
| 2,072,154 | 3/1937 | Butterfield | 210—45 |
| 2,359,748 | 10/1944 | Clemens | 210—45 |
| 3,279,603 | 10/1966 | Busse | 210—67 |
| 3,342,731 | 9/1967 | Baumann et al. | 210—45 |
| 3,345,288 | 10/1967 | Sontheimer | 210—10 |

MICHAEL E. ROGERS, *Primary Examiner.*

U.S. Cl. X.R.
210—10, 18, 45, 67